(12) United States Patent
Katagiri et al.

(10) Patent No.: US 6,905,248 B2
(45) Date of Patent: Jun. 14, 2005

(54) ELECTROCONDUCTIVE GREASE-FILLED BEARING

(75) Inventors: Chikara Katagiri, Kuwana (JP); Kenichiro Naito, Kuwana (JP); Atsushi Morooka, Osaka (JP); Hidenori Wakamatsu, Kitaibaraki (JP); Yasumichi Kido, Kitaibaraki (JP); You Doi, Kitaibaraki (JP); Jiro Yurimoto, Kitaibaraki (JP)

(73) Assignee: NTN Corporation, Osaka (JP)

( * ) Notice: Subject to any disclaimer, the term of this patent is extended or adjusted under 35 U.S.C. 154(b) by 47 days.

(21) Appl. No.: 10/688,134

(22) Filed: Oct. 17, 2003

(65) Prior Publication Data

US 2004/0081380 A1 Apr. 29, 2004

(30) Foreign Application Priority Data

Oct. 22, 2002 (JP) ........................... 2002-306731
Aug. 20, 2003 (JP) ........................... 2003-295872

(51) Int. Cl.$^7$ ................................ F16C 33/36
(52) U.S. Cl. ...................................... 384/462
(58) Field of Search .................... 384/462, 470, 384/476, 606, 473

(56) References Cited

FOREIGN PATENT DOCUMENTS

| JP | 57-3897 | 1/1982 |
| JP | 9-72403 | 3/1998 |
| JP | 10-30096 | 3/1998 |

*Primary Examiner*—Lenard A. Footland
(74) *Attorney, Agent, or Firm*—Butzel Long

(57) ABSTRACT

An electroconductive grease-filled bearing is a rolling bearing comprising an inner race 11 and an outer race 12, both of the races being coaxially provided, a plurality of steel balls 13 radially being retained between track surfaces of the races, the bearing rotatably supporting the edge of heating roll 6a in the fixing section of an electrostatic transfer copying machine, fixed to the inner periphery of inner race 11, an electroconductive grease to be filled between the track surfaces comprising a fluorocarbon oil as a base oil and graphite (or together with polytetrafluoroethylene) as a thickening agent. The electroconductive grease has a distinguished electroconductance so as to effectively discharge the static electricity, and has a distinguished heat-resistant durability even at elevated temperatures, and also prevents revolution failure due to the increased torque caused by an excessive lowering in the grease consistency, while maintaining the good electroconductance. The bearing is most suitable for rotatably supporting a photosensitive drum or a heating roll or a pressing-heating roll in the fixing section in an electrostatic transfer copying machine, and is also effective for stabilization of printed images.

34 Claims, 2 Drawing Sheets

ELECTROCONDUCTIVE GREASE-FILLED BEARING

BACKGROUND OF THE INVENTION (1) Field of the Invention

The present invention relates to an electroconductive grease-filled bearing suitable for bearings at positions requiring an electrostatic discharge function and a high temperature durability.

(2) Related Art

Electrophotographic process machinery including electrostatic transfer copying machines such as digital PPC and color PPC, and printers of color LBP or color LED type system is now widely used. In the case of, for example, the former electrostatic transfer copying machines, it is a common practice to form electrostatic latent images on a photosensitive drum, then deposit toners thereon, transfer the visual images thus formed on the photosensitive drum onto printing paper by electrocharging a transfer electrode, and then forward the printing paper released from the photosensitive drum to a roll in a fixing section, thereby fixing the toners to the printing paper surface by heating and pressing. Static electricity is generated, for example, on the roll in the fixing section by passage of the printing paper through the printing course. As a means of discharging the static electricity to the outside, usually a discharging mechanism is provided by earthing the roll shaft end.

Such provision of the static electricity discharging system at the roll shaft end inevitably gives rise to an increase in number of additional parts. To reduce the number of such additional parts, so called "electroconductive bearing", where the roll bearing per se is made electroconductive, has been so far used. It is well known that the electroconductive bearing includes such a type that electroconductive grease is filled in the interior of bearing or such a type that the bearing is provided with an electroconductive seal or an electroconductive member. Above all, the electroconductive grease-filled bearing requires neither additional special structural parts nor materials and thus is cost-wise advantageous, resulting much use in bearing positions requiring the electrostatic discharging.

The fixing section of the electrostatic transfer copying machine is a zone for fixing the toners electrostatically deposited on the printing paper by pressing at elevated temperatures, e.g. higher than 100° C., and thus support bearings of the rolls in the fixing section are usually operated at such elevated temperatures. Among the rolls in the fixing section, particularly the heating roll has an internally heating structure using a heater provided inside the hollow shaft, and the bearings that rotatably support the heating roll are more often exposed to elevated temperatures, e.g. 200° C. or higher.

That is, the bearings that support the rolls in the fixing section are required to have not only an electroconductive function to discharge the static electricity, but also a function of heat-resistant durability to operation at elevated temperatures. To meet the tendency of higher and higher temperatures due to higher speed operation of the machinery, much higher level is required even now for these two function.

Generally, the conventional electroconductive grease capable of satisfying such higher level required for the two functions contains carbon black as a thickening agent and electroconductive substances such as graphite, copper powder, etc. For example, a grease composition, which contains various kinds of carbon black as a thickening agent and an additive, etc. is disclosed in JP-A-57-3897. The grease composition has a good initial electoconductivity and can satisfy the electroconductive durability required for the ordinary grease, but the electroconductive grease must satisfy a prolonged electroconductive durability at elevated temperatures. However, carbon black with a structurally poor lubricability fails to satisfy such prolonged electroconductive durability requirement.

In a grease composition comprising a specific propylene polymer and an electroconductive component (including graphite), a method of decreasing a proportion of a thickening agent having an adverse effect on the electroconductance and adding a thickener (viscosity increasing agent) to assure the electroconductance is disclosed in JP-A-10-30096, where mineral oil or ester oil is used as a base oil, and thus the grease composition has a poor durability at elevated temperatures, as compared with the conventional fluorocarbon oil grease and also fails to satisfy the required functions when used in the above-mentioned zone.

Furthermore, the above-mentioned conventional grease compositions sometimes suffer from much leakage of base oil components from bearings due to separation of the base oil from the grease when used at elevated temperatures, e.g. 200° C. or higher, resulting in fouling at and around the bearings. Once the base oil component leaks from the bearings and deposits on the surfaces of the photosensitive drum or the rolls in the fixing section in the electrophotographic process machinery such as an electrostatic transfer copying machines and printers, the electrostatic latent images formed on the photosensitive drum will be disturbed, or the printing paper will be fouled in the fixing step, resulting in failure to satisfy the basic functions of electrophotographic process machinery. Furthermore, once separation of the base oil takes place, lubrication will be deteriorated in positions requiring the prolonged durability, resulting in failure to satisfy the required level of the functions.

SUMMARY OF THE INVENTION

An object of the present invention is to provide an electroconductive grease-filled bearing suitable particularly for rolling bearings for the photosensitive drum or rolls in the fixing section of an electrostatic transfer copying machine as bearings in the zone requiring an electrostatic discharging function and a prolonged durability at elevated temperatures.

The object of the present invention can be attained by an electroconductive grease-filled bearing, which is a rolling bearing comprising an inner race and an outer race, both of the races being coaxially provided, a plurality of rolling elements radially being retained between track surfaces of the races, the rolling bearing rotatably supporting a shaft fitted on the inner periphery of the inner race, an electroconductive grease, which comprises a fluorocarbon oil as a base oil and graphite or graphite and polytetrafluoroethylene as a thickening agent, being filled between the track surfaces.

By filling the present electroconductive grease comprising a fluorocarbon oil as a base oil and graphite (or together with polytetrafluoroethylene) as a thickening agent between the inner race and the outer race, a distinguished electroconductance can be obtained to effectively discharge the static electrocity, and also a distinguished heat-resistant durability can be maintained even under operating conditions at elevated temperatures, e.g. 200° C. or higher.

Furthermore, by setting a proportion of the thickening agent to 10–50% by weight, preferably 10–40% by weight, on the basis of the total weight of the composition, a liability to lose an appropriate property to use as a lubricant due to lowering in the grease consistency can be prevented, while maintaining a good electroconductance.

Still furthermore, by setting a proportion of polytetrafluoroethylene to be used together with the graphite to not more than 30% by weight, preferably 5–25% by weight, on the basis of the total weight of the composition, separation of base oil from the grease can be suppressed.

DETAILED DESCRIPTION OF THE INVENTION

Figure 1:
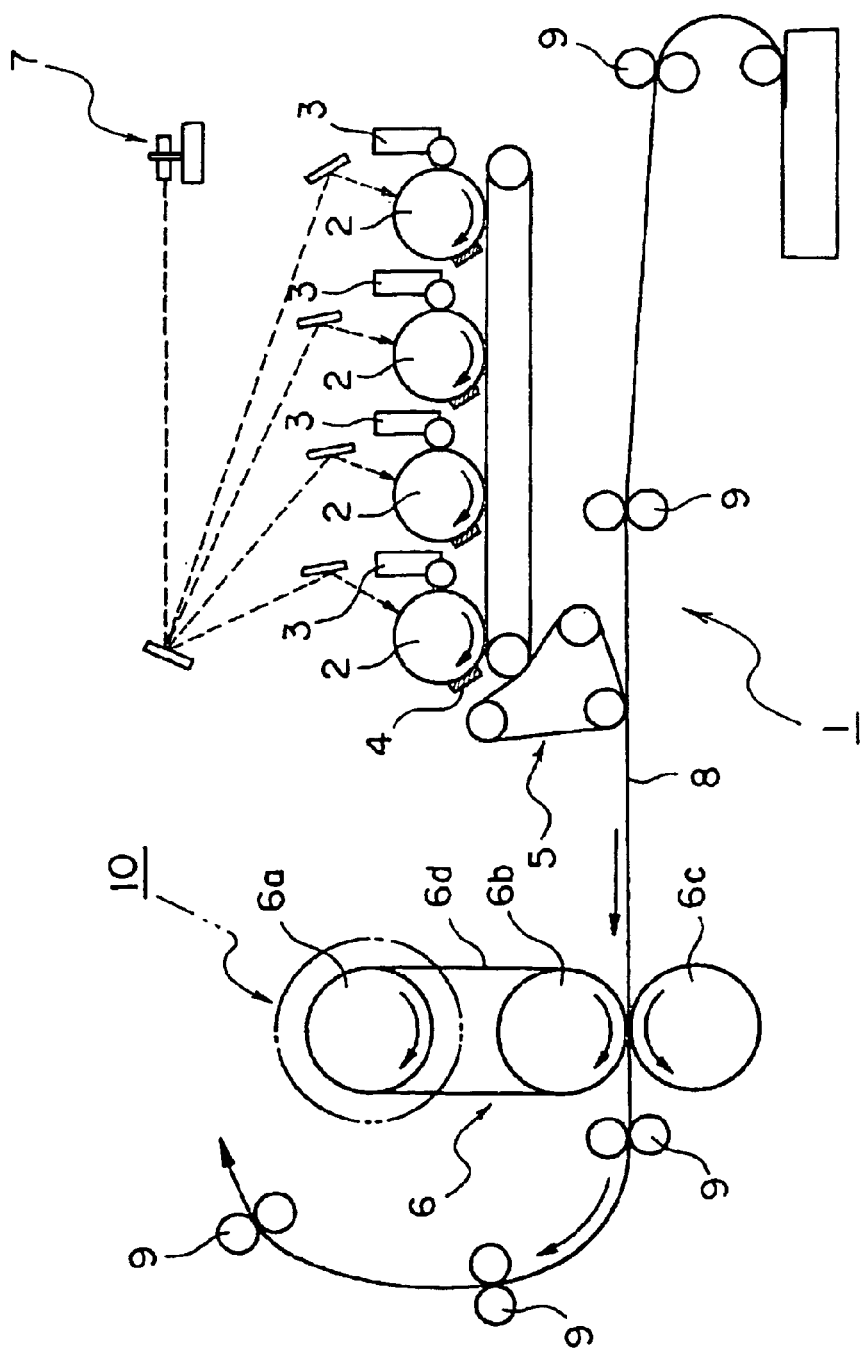
FIG. 1 is a schematic structural layout of an electrostatic transfer copying machine provided with the present electroconductive grease-filled bearing.
Figure 2:
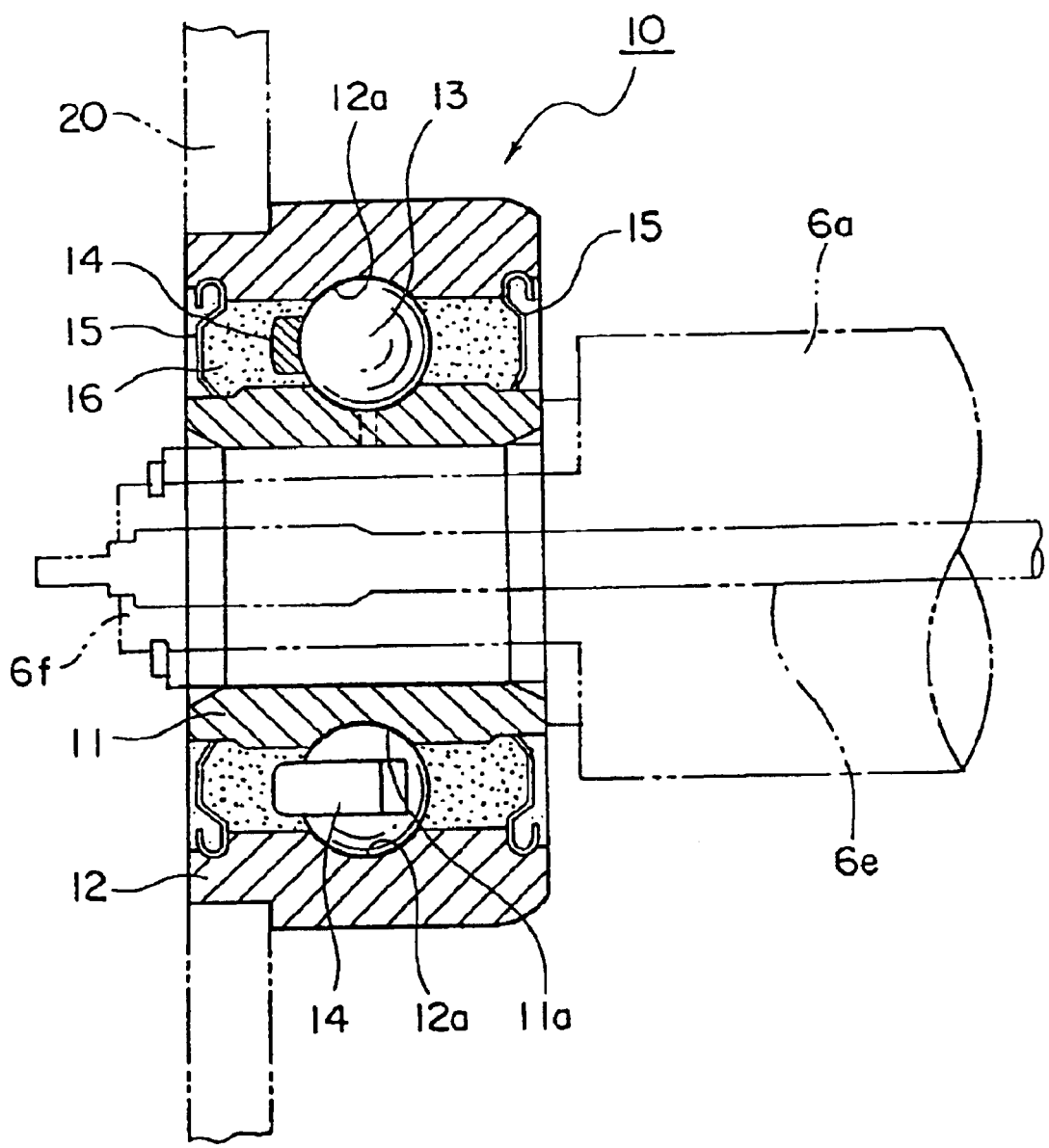
FIG. 2 is a vertically cross-sectional structural view of the present electroconductive grease-filled bearing fitted to a machinery body housing.

Embodiments of the present electroconductive grease-filled bearing will be described below, referring to the drawings. FIG. 1 is a structural view schematically showing the layout of electrostatic transfer copying machine 1, and FIG. 2 is a vertical cross-sectional structural view showing the present bearing 10 rotatably supporting the heating roll in the fixing section of the electrostatic transfer copying machine.

In FIG. 1, machine 1 has a set of four tandem drums and comprises four photosensitive drums 2 in the main section of the tandem drums, each of the drums being provided with developing section 3 and electrocharging electrode 4 correspondingly, and intermediate transfer member 5, fixing section 6, polygon scanner motor 7 as an image writing means, etc.

That is, electrosensitive drums 2 are electrostatically charged by corresponding electrocharging electrodes 4, and upon light exposure through polygon scanner motor 7 electrostatic latent images are formed on photosensitive drums 2 by electrostatic charges according to light intensities. Toners with the charge of counter-polarity are made to deposit on the electrostatic latent images by developing means 3 to form visible images, and the visible images are then transferred onto intermediate transfer member 5 and further onto printing paper 8. Printing paper 8 is forwarded to fixing section 6 by feed rollers 9 provided in given positions, where the toners are fixed to the surface of printing paper 8 by heating-pressing.

Fixing section 6 comprises heating roll 6a, fixing roll 6b, pressing-heating roll 6c, etc. Endless resin sheet 6d of polyimide, etc. is looped between heating roll 6a and fixing roll 6b, and the heat from heating roll 6a is transferred to printing paper 8 through said resin sheet 6d.

As shown in FIG. 2, heating roll 6a in said fixing section 6 has internal heater 6e within and along roll shaft, and is rotatably supported by bearing 10 of the present invention. Bearing 10 of the present invention as a rolling bearing has inner race 11 fitted to the outer periphery of shaft end 6f of heating roll 6a, and also has outer race 12 fixed to machinery body housing 20 coaxially with respect to inner race 11. The outer peripheral surface of inner race 11 and the inner peripheral surface of outer race 12 present track surfaces 11a and 12a, respectively, and a plurality of steel balls 13 as rolling elements are radially provided between inner and outer peripheral track surfaces 11a and 12a and rotatably retained by retainers 14, so that steel balls 13 may not be deviated from the tracks. Spaces between track surfaces 11a and 12a retaining steel balls 13 are closed by sealing members 15 on both sides thereof to form a hermetically sealed state. Electroconductive grease 16 is filled into the hermetically sealed spaces.

When said machine 1 is put into operation, so called "ON operation", printing paper 8 is conveyed by feed rollers 9. Static electricity generated on heating roll 6a in fixing section 6 is transmitted to inner race 11 of bearing 10 of the present invention and then to outer race 12 through electroconductive grease or via route of inner race 11→steel balls 13→outer race 12, and electrically discharged from outer race 12.

Electroconductive grease 16 plays an earthing function of discharging the static electricity in the manner as described above, and such earthing function can be attained by the following grease composition. That is, electroconductive grease 16 comprises a fluorocarbon oil as a base oil and graphite or graphite and polytetrafluoroethylene as a thickening agent for increasing the electroconductance as basic components.

Fluorocarbon oil represented by the following formula is used as a base oil in the present invention:

$$RfO(C_3F_6O)p(C_2F_4O)q(CF_2O)rRf$$

where Rf is a perfluoro lower alkyl group such as perfluoromethyl, perfluoroethyl, etc.; $C_3F_6O$ group, $C_2F_4O$ group and $CF_2O$ group are bonding at random; p+q+r=3–200, but p, q or r may be zero.

Specific examples of polyether-based fluorocarbon oil represented by the foregoing general formula include the following oils:

$$RfO(CF_2CF_2O)m(CF_2O)nRf \qquad (1)$$

where m+n=3–200, and m:n=(10:90)–(90:10).

The oil can be obtained by completely fluorinating the precursor formed by photo-oxidation polymerization of tetrafluoroethylene.

$$RfO\,[CF(CF_3)CF_2O]m(CF_2O)nRf \qquad (2)$$

where $CF(CF_3)CF_2O$ group and $CF_2O$ group are bonding at random, m+n=3–200, and m:n=(10:90)–(90:10).

The oil can be obtained by completely fluorinating the precursor formed by photo-oxidation polymerization of hexafluoropropene.

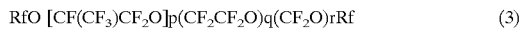
$$RfO\,[CF(CF_3)CF_2O]p(CF_2CF_2O)q(CF_2O)rRf \qquad (3)$$

where $CF(CF_3)CF_2O$ group, $CF_2CF_2O$ group and $CF_2O$ group are bonding at random, p+q+r=3–200, but p, q or r may be zero.

The oil can be obtained by completely fluorinating the precursor formed by photo-oxidation polymerization of tetrafluoroethylene and hexafluoropropene.

$$RfO(CFXCF_2O)nCF_2X \qquad (4)$$

where X is a $CF_3$ group or an F atom and n=3–50.

The oil can be obtained by subjecting hexafluoropropene oxide or tetrafluoroethylene oxide to anionic polymerization in the presence of a cesium fluoride catalyst and subjecting the resulting acid fluoride compound having a terminal CFXCOF group to a fluorine gas treatment.

Other fluorohydrocarbon oils than those represented by the foregoing general formulae can be also used. For example, the following polyether-based fluorocarbon oil can be used in the present invention.

F(CF$_2$CF$_2$CF$_2$O)nCF$_2$CF$_3$ where n=2–100.

The oil can be obtained by subjecting 2,2,3,3-tetrafluorooxetane to anionic polymerization in the presence of a cesium fluoride catalyst and then the resulting fluoropolyether, (CH$_2$CF$_2$CF$_2$O)n, to a fluorine gas treatment under ultraviolet ray irradiation at 160°–300° C.

The fluorocarbon oils mentioned above as specific examples can be used alone or in mixture thereof The fluorocarbon oils for use in the present invention can have any kinematic viscosity, but those with a kinematic viscosity of 5–1,500 mm$^2$/sec (40° C.) in view of their role as a lubricant, preferably 250–1,000 mm$^2$/sec (40° C. ) when taken into consideration that it is used under elevated temperature conditions. That is, below about 5 mm$^2$/sec, the evaporation rate is too high to satisfy the requirements for the standard of JIS rolling bearing grease species 3 specified as a heat-resistant grease, stating that the evaporation rate should be not more than 1.5%. When the kinetic viscosity exceeds 1,500 mm$^2$/sec, the pour point (JIS K-2283) will be 10° C. or higher, the bearing fails to start rotating operation in the case of low temperature start up. Thus heating is required for the start up. That is, the kinetic viscosity outside the above-mentioned specific range is not satisfactory for appropriate use as a grease.

Commercially available graphite can be usually used in the present electroconductive grease as a thickening agent, in accordance with the intended use. Any of natural or synthetic commercially available graphite can be used. Natural graphite for use in the present invention can be obtained by refining the graphites deposited in metamorphic rocks of natural origin (crystallized limestone or gneiss), followed by pulverization, whereas synthetic graphite for use in the present invention can be obtained by once firing molded pitch, cokes, tar, etc. at about 1,200° C. and charging the fired product into a graphitization furnace for an elevated temperature treatment at about 2,000°–about 3,000° C.

Any kind of graphite can be used, but particularly amorphous graphite preferable. The amorphous graphite is somewhat inferior in lubrication to flake or flaky graphite, but can be more finely pulverized than the ordinary flaky graphite or can be reduced to smaller particle sizes. Thus, it is easy to obtain an appropriate mixing proportion of graphite required for the electroconductive grease.

It is desirable that the graphite has particle sizes of 1–20 μm (determined by an electron microscope) and a DBP oil absorption of 20–100 ml/100 g (determined by dibutyl phthalate oil absorption test). Graphite with smaller particle sizes or a narrower particle size distribution range is hard to coagulate in grease and has a better dispersibility therein, whereas graphite with too small particle sizes or a higher DBP oil absorption is easy to coagulate even in a small mixing proportion of the graphite, resulting in hardening of the grease. That is, no good electroconductance is obtainable.

To obtain good electroconductance and appropriate grease consistency at the same time, a mixing proportion of a thickening agent in the grease is 10–50% by weight, preferably 10–40% by weight, more preferably 15–30% by weight. Above 50% by weight, appropriate properties for use as a lubricant cannot be obtained due to the much lowering in the grease consistency, whereas below 10% by weight no better electroconductance can be obtained. That is, below 10% by weight effective electroconductive properties are hard to obtain, whereas above 50% by weight no more appropriate properties for use as a lubricant are hard to obtain due to the much lowering in the grease consistency.

Polytetrafluoroethylene to be used together with graphite likewise as a thickening agent can be synthesized by emulsion polymerization, suspension polymerization or solution polymerization of tetrafluoroethylene, and then the resulting polytetrafluoroethylene is usually subjected to thermal decomposition, decomposition by electron beam irradiation, physical pulverization, etc. to adjust the number average molecular weight Mn to about 1,000–about 100,000 before use as a polytetrafluoroethylene thickening agent. The polytetrafluoroethylene so prepared is used in a mixing proportion of 0–30% by weight, preferably 5–25% by weight in the grease. The polytetrafluoroethylene, when used in such a preferable proportion, can suppress separation of base oil from the grease even at elevated temperatures, e.g. 200° C. or higher, for example, under operating conditions at 200°–250° C., to contribute to maintenance of better heat-resistant durability. Above 30% by weight no more appropriate properties for use as a lubricant can be obtained due to the much lowering in the grease consistency.

Polytetrafluoroethylene to be added to suppress separation of base oil from the grease has a tendency to harden the grease consistency per se. But, even if the mixing proportion of polytetrafluoroethylene is increased by using polytetrafluoroethylene with an average primary particle size of 0.2–15 μm, preferably 1–10 μm (determined by an electron microscope), the appropriate grease consistency as a bearing grease can be maintained. When the average primary particle size of polytetrafluoroethylene is less than 0.2 μm, the grease tends to be hardened by addition of a small proportion of polytetrafluoroethylene, and when the grease consistency is on the same level, no more suppression of base oil separation is expectable due to the small proportion of added polytetrafluoroethylene. When the average primary particle size is larger than 15 μm, a large proportion of polytetrafluoroethylene must be added to the grease to suppress the base oil separation, and thus the electroconductance will be lowered due to the large proportion of added polytetrafluoroethylene.

The present electroconductive grease comprising the aforementioned basic components can further contain, if necessary, well known additives so far used in the conventional lubricants, depending on an intended use. The additives include, for example, an antioxidant, a rust preventing agent, a corrosion inhibitor, an extreme pressure agent, an oiliness improver, a solid lubricant, etc.

The antioxidant includes, for example, phenol-based antioxidants such as 2,6-t-butyl-4-methylphenol, 4,4'-methylenebis(2,6-di-t-butyl-phenol), etc. and amine-based antioxidants such as alkyldiphenylamine (alkyl group has 4–20 carbon atoms), triphenylamine, phenyl-α-naphthylamine, phenothiazine, alkylated phenyl-α-naphthylamine, phenithiazine, alkylated phenothiazine, etc., which can be used alone or in a mixture of at least two thereof.

The rust preventing agent includes, for example, fatty acids, fatty acid soaps, alkylsulfonates, fatty acid amines, paraffin oxide, polyoxyethylene alkyl ethers, etc.

The corrosion inhibitor includes, for example, benzotriazole, benzoimidazole, thiadiazole, etc.

The extreme pressure agent includes, for example, phosphorus-based compounds such as phosphate esters, phosphite esters, phosphate ester amines, etc., sulfur-based compounds such as sulfides, disulfides, etc., chlorine-based compounds such as chloroparaffin, diphenyl chloride, etc. and organometallic compounds such as zinc dialkyldithiophosphate, molybdenum dialkyldithiocarbamate, etc.

The oiliness improver includes, for example, fatty acids, higher alcohols, polyhydric alcohols, polyhydric alcohol esters, aliphatic esters, aliphatic amines, fatty acid monoglycerides, etc.

The solid lubricant includes, for example, molybdenum disulfide, boron nitride, silane nitride, etc.

The present electroconductive grease-filled bearing can be given a distinguished electroconductance so that the static electricity can be effectively discharged, and also a distinguished heat-resistant durability even under elevated temperature operating conditions at 200° C. or higher by filling an electroconductive grease comprising a fluorocarbon oil as a base oil and graphite (or together with polytetrafluoroethylene) as a thickening agent between the inner race and the outer race of the bearing. By setting a proportion of the thickening agent such as graphite, etc. to an appropriate range (10–50% by weight, preferably 10–40% by weight), revolution failure due to the increased torque caused by an excessive lowering in the grease consistency can be prevented, while maintaining the good electroconductance.

When a proportion of polytetrafluoroethylene to be used together with graphite is set to not more than 30% by weight, preferably 5–25% by weight, separation of base oil from the grease can be suppressed. The present electroconductive grease-filled bearing is most suitable for bearing rotatably supporting a photosensitive drum or a heating roll or a pressing-heating roll in the fixing section in electrophotographic process machinery such as an electrostatic transfer copying machine, and is also effective for stabilization of printed images.

PREFERRED EMVODIMENTS OF THE INVENTION

The present invention will be described in detail below, referring to Examples.

EXAMPLES

Preparation of Electroconductive Grease

The following 5 kinds of fluorocarbon base oils (A to E) or the following other 3 kinds of oils (F to H) and the following 9 kinds of thickening agents (A to I) were used in mixing proportions (unit: % by weight) as given in Table 1 to prepare greases of Examples 1 to 31 and Comparative Examples 1 to 7.

<<Base Oil>>

|  | Kinetic viscosity (40° C.) |
|---|---|
| A) RfO [CF(CF$_3$) CF$_2$O] nRf | 420 mm$^2$/sec |
| B) RfO [CF(CF$_3$) CF$_2$O] m(CF$_2$O)nRf | 420 mm$^2$/sec |
| C) RfO [CF(CF$_3$) CF$_2$O] nRf | 240 mm$^2$/sec |
| D) RfO [CF(CF$_3$) CF$_2$O] m(CF$_2$O)nRf | 180 mm$^2$/sec |
| E) RfO (CF$_2$CF$_2$O) m(CF$_2$O)nRf | 150 mm$^2$/sec |
| F) Poly-α-olefin oil | 18 mm$^2$/sec |
| G) Silicone oil | 360 mm$^2$/sec |
| H) Ester oil | 30 mm$^2$/sec |

<<Thickening Agent>>

A) Amorphous graphite (particle sizes: 2–3 μm, DBP oil absorption 65 ml/100 g).

B) Flake graphite (particle sizes: 2–3 μm, DBP oil absorption
   75 ml/100 g)

C) Flake graphite (particle sizes: 2–3 μm, DBP oil absorption
   83 ml/100 g)

D) Polytetrafluoroethylene
   (by emulsion polymerization; MW: 1×10$^5$–2×10$^5$, average primary particle size: 1 μm)

E) Polytetrafluoroethylene
   (by suspension polymerization; MW: 5×10$^4$–2×10$^5$, average primary particle size: 5 μm)

F) Polytetrafluoroethylene
   (by suspension polymerization; MW: 5×10$^4$–2×10$^5$, average primary particle size: 10 μm)

G) Polytetrafluoroethylene
   (by suspension polymerization; MW: 5×10$^4$–2×10$^5$, average primary particle size: 15 μm)

H) Polytetrafluoroethylene
   (by suspension polymerization; MW: 1×10$^5$–2×10$^5$, average primary particle size: 0.2 μm)

I) Acetylene black

TABLE 1

|  | Base oil | | | | | | | | Thickening agent | | | | | | | | | |
|---|---|---|---|---|---|---|---|---|---|---|---|---|---|---|---|---|---|---|
|  | A | B | C | D | E | F | G | H | A | B | C | D | E | F | G | H | I |
| Example 1 |  | 76 |  |  |  |  |  |  | 23 |  |  |  |  |  |  | 1 |  |
| Example 2 | 76 |  |  |  |  |  |  |  | 23 |  |  |  |  |  |  |  | 1 |
| Example 3 | 77 |  |  |  |  |  |  |  | 20 |  |  | 3 |  |  |  |  |  |
| Example 4 |  | 77 |  |  |  |  |  |  | 20 |  |  | 3 |  |  |  |  |  |
| Example 5 |  | 77 |  |  |  |  |  |  | 20 |  |  |  | 3 |  |  |  |  |
| Example 6 |  |  | 77 |  |  |  |  |  | 20 |  |  | 3 |  |  |  |  |  |
| Example 7 |  |  |  |  | 77 |  |  |  | 20 |  |  | 3 |  |  |  |  |  |
| Example 8 | 75 |  |  |  |  |  |  |  | 20 |  |  |  | 5 |  |  |  |  |
| Example 9 | 75 |  |  |  |  |  |  |  | 20 |  |  |  |  | 5 |  |  |  |
| Example 10 | 75 |  |  |  |  |  |  |  | 20 |  |  |  |  |  | 5 |  |  |
| Example 11 |  | 75 |  |  |  |  |  |  | 20 |  |  |  | 5 |  |  |  |  |
| Example 12 |  | 75 |  |  |  |  |  |  | 20 |  |  |  |  | 5 |  |  |  |
| Example 13 | 70 |  |  |  |  |  |  |  | 20 |  |  | 10 |  |  |  |  |  |
| Example 14 | 70 |  |  |  |  |  |  |  | 20 |  |  |  | 10 |  |  |  |  |
| Example 15 | 70 |  |  |  |  |  |  |  | 20 |  |  |  |  | 10 |  |  |  |
| Example 16 | 70 |  |  |  |  |  |  |  |  |  | 20 |  |  | 10 |  |  |  |
| Example 17 | 70 |  |  |  |  |  |  |  |  |  |  | 20 |  | 10 |  |  |  |

TABLE 1-continued

| | Base oil | | | | | | | | Thickening agent | | | | | | | | | |
|---|---|---|---|---|---|---|---|---|---|---|---|---|---|---|---|---|---|---|
| | A | B | C | D | E | F | G | H | A | B | C | D | E | F | G | H | I |
| Example 18 | | 70 | | | | | | | 20 | | | | | 10 | | | |
| Example 19 | | | 70 | | | | | | 20 | | | | | 10 | | | |
| Example 20 | | | | 70 | | | | | 20 | | | | | 10 | | | |
| Example 21 | | | | | 70 | | | | 20 | | | | | 10 | | | |
| Example 22 | 70 | | | | | | | | 20 | | | | | | 10 | | |
| Example 23 | 70 | | | | | | | | 20 | | | | | | | 10 | |
| Example 24 | 68 | | | | | | | | 17 | | | | 15 | | | | |
| Example 25 | 68 | | | | | | | | 17 | | | | | 15 | | | |
| Example 26 | 68 | | | | | | | | 17 | | | | | | 15 | | |
| Example 27 | | 68 | | | | | | | 17 | | | | | 15 | | | |
| Example 28 | | | 68 | | | | | | 17 | | | | | 15 | | | |
| Example 29 | 75 | | | | | | | | 25 | | | | | | | | |
| Example 30 | 75 | | | | | | | | | | 25 | | | | | | |
| Example 31 | 75 | | | | | | | | | | | 25 | | | | | |
| Comp. Ex. 1 | 89 | | | | | | | | | | | | | | | 11 | |
| Comp. Ex. 2 | 80 | | | | | | | | | | | | 10 | | | 10 | |
| Comp. Ex. 3 | 80 | | | | | | | | | | | | | 10 | | 10 | |
| Comp. Ex. 4 | 65 | | | | | | | | | | | | | 35 | | | |
| Comp. Ex. 5 | | | | | | 80 | | | 20 | | | | | | | | |
| Comp. Ex. 6 | | | | | | | 80 | | 20 | | | | | | | | |
| Comp. Ex. 7 | | | | | | | | 80 | 20 | | | | | | | | |

Various Tests on Electroconductive Greases

The resulting greases were subjected to the following tests.

1) Rotating Life Test

Bearings 10 of the present invention as shown in FIG. 2, each filled with electroconductive greases 16 as shown in Examples 1 to 31 and Comparative Examples 1 to 7 were fitted to a rotating test machine one by one and subjected to a heat-resisting test under the following test conditions:

<<Test Conditions>>

Test temperature: 250° C.

Load (applied load): Fr=1960N [200 kgf]

Number of revolutions: 100 revolutions/min.

Grease filling rate: 25%

2) Determination Test of Base Oil Separability

The electroconductive greases of Examples 1 to 31 and Comparative Examples 1 to 3 and the conventional fluorocarbon-based grease of Example 4 were subjected to determination of base oil separative and consistency under the following conditions, using a tester.

<<Determination Conditions>>

Base oil separability: according to JIS K2220.5.7.
   Operating surrounding temperature: 200° C. or 250° C.
   Maximum operating time: 24 hours Consistency: according to JIS K2220.5.3.
   25° C., 60W The results are shown in the following Table 2:

TABLE 2

| | | Base oil separatability | | |
|---|---|---|---|---|
| | Life (time) | 200° C. | 250° C. | Consistency |
| Example 1 | 789 | 8.6 | 13.8 | 258 |
| Example 2 | 760 | 8.8 | 14.2 | 265 |
| Example 3 | 780 | 8.1 | 13.8 | 262 |
| Example 4 | 780 | 8.3 | 13.5 | 252 |
| Example 5 | 750 | 8.5 | 14.0 | 260 |
| Example 6 | 720 | 8.8 | 14.3 | 252 |
| Example 7 | 720 | 9.0 | 15.4 | 256 |
| Example 8 | 775 | 6.8 | 11.4 | 240 |
| Example 9 | 780 | 6.6 | 11.5 | 245 |
| Example 10 | 760 | 7.0 | 12.3 | 245 |
| Example 11 | 780 | 6.5 | 11.2 | 246 |
| Example 12 | 750 | 8.3 | 13.6 | 255 |
| Example 13 | 730 | 5.8 | 10.2 | 206 |
| Example 14 | 780 | 5.8 | 10.2 | 234 |
| Example 15 | 790 | 4.5 | 9.2 | 236 |
| Example 16 | 780 | 5.6 | 11.3 | 230 |
| Example 17 | 780 | 5.8 | 11.8 | 235 |
| Example 18 | 780 | 4.8 | 9.5 | 240 |
| Example 19 | 750 | 6.8 | 12.8 | 250 |
| Example 20 | 740 | 8.6 | 15.2 | 258 |
| Example 21 | 750 | 9.0 | 15.4 | 266 |
| Example 22 | 770 | 9.4 | 14.3 | 262 |
| Example 23 | 730 | 6.2 | 11.2 | 224 |
| Example 24 | 780 | 5.3 | 9.8 | 221 |
| Example 25 | 750 | 4.3 | 9.0 | 228 |
| Example 26 | 760 | 5.8 | 10.7 | 232 |
| Example 27 | 740 | 4.3 | 9.1 | 230 |
| Example 28 | 740 | 6.7 | 12.2 | 243 |
| Example 29 | 760 | 8.8 | 14.1 | 256 |
| Example 30 | 760 | 8.6 | 13.9 | 254 |
| Example 31 | 750 | 8.3 | 13.8 | 251 |
| Comparative Example 1 | 780 | 11.2 | 18.3 | 255 |
| Comparative Example 2 | 750 | 7.6 | 16.2 | 228 |
| Comparative Example 3 | 740 | 7.8 | 15.6 | 234 |
| Comparative Example 4 | 750 | 11.8 | 15.8 | 268 |
| Comparative Example 5 | 110 | | | |
| Comparative Example 6 | 90 | | | |
| Comparative Example 7 | 70 | | | |

As shown in the results of life test, bearings filled with any one of electroconductive greases of Examples 1 to 31 and Comparative Examples 1 to 3, each using the fluorocarbon base oil had s heat-resistant time (life) of about 700 to about 800 hours, whereas bearings filled with commonly used electroconductive greases of Comparative Examples 5 to 7 had a heat-resistant time of about 100 hours or less, clearly showing differences in performance therebetween. The heat-resistant time of the conventional fluorocarbon-based grease of Comparative Example 4 is a little short of 800 hours, which showed a substantially equivalent heat-resistant life at elevated temperatures to those of Examples 1 to 31, but the grease of Comparative Example 4 had no electroconductive function.

As to the base oil separability using base oil A or B, Examples 1 to 5 using 1 to 3% by weight of polytetrafluoroethylene as a thickening agent had a base oil separability of 8.5% by weight on the average at 200° C., and 13.9% by weight on the average at 250° C., whereas Examples 8 to 11 using 5% by weight of polytetrafluoroethylene had a base oil separability of 6.7% by weight on the average at 200° C. and 11.6% by weight on the average at 250° C., showing a decrease in the base oil separability by 21.2% at 200° C. and by 16.5% at 250° C., as compared with Examples 1 to 5.

Likewise, Examples 13 to 18, 22 and 23 using 10% by weight of polytetrafluoroethylene had a base oil separability of 5.4% by weight on the average at 200° C. and 10.4% by weight on the average at 250° C., showing a decrease in the base oil separability by 36.5% at 200° C. and by 25.2% at 250° C., compared with Examples 1 to 5, and Examples 24 to 27 using 15% by weight of polytetrafluoroethylene had a base oil separability of 4.9% by weight on the average at 200° C. and 9.7% by weight on the average at 250° C., showing a decrease in the base oil separability by 42.4% at 200° C. and by 30.2% at 250° C., compared with Examples 1 to 5. It is evident from these results that the base oil separability can be improved under elevated temperature conditions of 200° C. or higher by using 5% by weight or more of polytetrafluoroethylene as an additional component to the thickening agent. Examples 29 to 31 using greases comprising fluorocarbon oil as a base oil and graphite as a thickening agent without using polytetrafluoroethylene as the additional component to the thickening agent had a substantially equivalent base oil separability to those of Examples 1 to 5.

In Examples 13 to 15, 22 and 23, particle sizes of polytetrafluoroethylene were changed in the same mixing proportion to determine the base oil separability and grease consistency. Example 22 using polytetrafluoroethylene with a primary particle size of 15 μm had the substantially same level of grease consistency and base oil separability as those of Comparative Example 4. Example 23 using polytetrafluoroethylene with a primary particle size of 0.2 μm had a tendency to increase the grease consistency but had a decreased base oil separability, whereas Examples 13 to 15 using polytetrafluoroethylene with primary particle sizes of 1–10 μm had a suppressed base oil separability and an appropriate grease consistency for use in the bearings. Examples 6, 7, 12, 19 to 21 and 28 using base oils with a low viscosity had a decreased base oil separability as in other Examples by increasing a proportion of polytetrafluoroethylene, but the decrease in the base oil separability was not so remarkable as that of Examples using fluorocarbon oil with a high viscosity as a base oil.

Compared with Comparative Example 1 using acetylene black as a thickening agent, Comparative Examples 2 and 3 using acetylene black and polytetrafluoroethylene as thickening agents had a decreased base oil separability by addition of polytetrafluoroethylene. Comparative Example 4 using the conventional fluorocarbon based grease had a base oil separability of 11.8% by weight at 200° C. and 15.8% by weight at 250° C.

3) Determination Test of Changes in Resistance with Time

Electroconductive greases of Examples 1 to 31 and Comparative Examples 1 to 3, and that of conventional fluorocarbon-based grease of Comparative Example 4 were subjected to determination of insulation resistance under the following conditions, using a resistant tester:

<<Determination Conditions>>
Operating surrounding temperature: 200° C.
Maximum operating time: 1,000 hours
Load (applied load): Fr=4.9N
Number of revolutions: 200 revolutions/min.
Controlling resistance: 300 kΩ
Power source voltage: 30V
The results are shown in the following Table 3.

TABLE 3

| | Resistance (kΩ) | | | | | |
|---|---|---|---|---|---|---|
| | 0 hour | 200 hours | 400 hours | 600 hours | 800 hours | 1000 hours |
| Example 1 | 2 | 9 | 29 | 17 | 60 | 2 |
| Example 2 | 3 | 14 | 40 | 75 | 67 | 28 |
| Example 3 | 4 | 30 | 120 | 200 | 110 | 30 |
| Example 4 | 3 | 30 | 130 | 190 | 100 | 19 |
| Example 5 | 4 | 28 | 188 | 219 | 161 | 57 |
| Example 6 | 8 | 30 | 189 | 320 | 380 | 400 |
| Example 7 | 10 | 50 | 158 | 254 | 280 | 210 |
| Example 8 | 7 | 21 | 38 | 112 | 115 | 90 |
| Example 9 | 4 | 16 | 67 | 153 | 106 | 65 |
| Example 10 | 10 | 25 | 56 | 178 | 194 | 98 |
| Example 11 | 6 | 20 | 60 | 90 | 87 | 98 |
| Example 12 | 8 | 30 | 189 | 320 | 380 | 400 |
| Example 13 | 10 | 110 | 216 | 388 | 372 | 346 |
| Example 14 | 6 | 15 | 68 | 160 | 170 | 90 |
| Example 15 | 5 | 10 | 42 | 115 | 95 | 35 |
| Example 16 | 0 | 273 | 569 | 768 | 641 | 578 |
| Example 17 | 0 | 294 | 486 | 534 | 739 | 603 |
| Example 18 | 5 | 15 | 35 | 154 | 118 | 103 |
| Example 19 | 2 | 35 | 175 | 291 | 362 | 392 |
| Example 20 | 9 | 25 | 198 | 310 | 370 | 390 |
| Example 21 | 10 | 50 | 158 | 254 | 280 | 210 |
| Example 22 | 18 | 36 | 79 | 216 | 208 | 189 |
| Example 23 | 8 | 48 | 102 | 182 | 230 | 288 |
| Example 24 | 12 | 35 | 106 | 193 | 170 | 167 |
| Example 25 | 15 | 33 | 145 | 235 | 169 | 156 |
| Example 26 | 20 | 51 | 134 | 186 | 172 | 206 |
| Example 27 | 18 | 48 | 148 | 213 | 198 | 245 |
| Example 28 | 15 | 102 | 267 | 364 | 436 | 376 |
| Example 29 | 2 | 8 | 26 | 30 | 52 | 23 |
| Example 30 | 3 | 12 | 24 | 38 | 47 | 36 |
| Example 31 | 2 | 6 | 38 | 29 | 68 | 48 |
| Comp. Ex. 1 | 15 | 263 | 739 | 578 | 520 | 538 |
| Comp. Ex. 2 | 18 | 305 | 682 | 592 | 573 | 584 |
| Comp. Ex. 3 | 9 | 283 | 487 | 561 | 632 | 649 |
| Comp. Ex. 4 | 33 | 1000 | 1000 | 1000 | 1000 | 1000 |

As is evident from the foregoing results, Examples 1 to 15 and 18 to 31 using fluorocarbon oil as a base oil had resistances stabilized to lower levels less than 400 kΩ against prolonged test time from 0 hour to 200 hours, to 400 hours, to 600 hours, to 800 hours and to 1,000 hours, whereas Example 16 using flake graphite as a thickening agent, Example 17 using flaky graphite and Comparative Examples 1 to 3 using acetylene black with an electroconductive function had a higher resistance with prolonged test time, and sometimes had a very high resistance such as 700 kΩ. Comparative Example 4 without any electroconductive function had a low resistance in the initial stage (0 hour) because no oil film was formed and inner race 11 and outer race 12 were brought into metal contact with steel balls 13 in bearing 10. After the oil film formation no electroconductance was observed at all.

What is claimed is:

1. An electroconductive grease-filled bearing, which is a rolling bearing comprising an inner race and an outer race, both of the races being coaxially provided, a plurality of rolling elements radially being retained between track surfaces of the races, the rolling bearing rotatably supporting a shaft fitted on the inner periphery of the inner race, an electroconductive grease, which comprises a fluorocarbon oil as a base oil and graphite as a thickening agent, being filled between the track surfaces.

2. An electroconductive grease-filled bearing according to claim 1, wherein the fluorocarbon oil as a base oil has a kinematic viscosity of 5–1,500 mm²/sec (40° C.).

3. An electroconductive grease-filled bearing according to claim 2, wherein the electroconductive grease comprises 50–90% by weight of the fluorocarbon oil and 50–10% by weight of the thickening agent, sum total being 100% by weight.

4. An electroconductive grease-filled bearing according to claim 2, wherein polytetrafluoroethylene is used as a thickening agent.

5. An electroconductive grease-filled bearing according to claim 4, wherein the electroconductive grease comprises 50–80% by weight of the fluorocarbon oil, 15–30% by weight of the graphite and 5–25% by weight of the polytetrafluoroethylene, sum total being 100% by weight.

6. An electroconductive grease-filled bearing according to claim 5, wherein the polytetrafluoroethylene has an average primary particle size of 0.2–15 μm.

7. An electroconductive grease-filled bearing according to claim 4, wherein the electroconductive grease comprises 50–80% by weight of the fluorocarbon oil, 15–30% by weight of the graphite and not more than 30% by weight of the polytetrafluoroethylene, sum being 100% by weight.

8. An electroconductive grease-filled bearing according to claim 7, wherein the polytetrafluoroethylene has an average primary particle size of 0.2–15 μm.

9. An electroconductive grease-filled bearing according to claim 4, wherein the polytetrafluoroethylene has an average primary particle size of 0.2–15 μm.

10. An electroconductive grease-filled bearing according to claim 1, wherein the fluorocarbon oil as a base oil has a kinematic viscosity of 250–1,000 mm²/sec (40° C.).

11. An electroconductive grease-filled bearing according to claim 10, wherein the electroconductive grease comprises 50–90% by weight of the fluorocarbon oil and 50–10% by weight of the thickening agent, sum total being 100% by weight.

12. An electroconductive grease-filled bearing according to claim 10, wherein polytetrafluoroethylene is used as a thickening agent.

13. An electroconductive grease-filled bearing according to claim 12, wherein the electroconductive grease comprises 50–80% by weight of the fluorocarbon oil, 15–30% by weight of the graphite and not more than 30% by weight of the polytetrafluoroethylene, sum being 100% by weight.

14. An electroconductive grease-filled bearing according to claim 13 6, wherein the polytetrafluoroethylene has an average primary particle size of 0.2–15 μm.

15. An electroconductive grease-filled bearing according to claim 12, wherein the electroconductive grease comprises 50–80% by weight of the fluorocarbon oil, 15–30% by weight of the graphite and 5–25% by weight of the polytetrafluoroethylene, sum total being 100% by weight.

16. An electroconductive grease-filled bearing according to claim 15, wherein the polytetrafluoroethylene has an average primary particle size of 0.2–15 μm.

17. An electroconductive grease-filled bearing according to claim 12, wherein the polytetrafluoroethylene has an average primary particle size of 0.2–15 μm.

18. An electroconductive grease-filled bearing according to claim 1, wherein the graphite is amorphous graphite.

19. An electroconductive grease-filled bearing according to claim 18, wherein the electroconductive grease comprises 50–90% by weight of the fluorocarbon oil and 50–10% by weight of the thickening agent, sum total being 100% by weight.

20. An electroconductive grease-filled bearing according to claim 18, wherein polytetrafluoroethylene is used as a thickening agent.

21. An electroconductive grease-filled bearing according to claim 20, wherein the electroconductive grease comprises 50–80% by weight of the fluorocarbon oil, 15–30% by weight of the graphite and not more than 30% by weight of the polytetrafluoroethylene, sum being 100% by weight.

22. An electroconductive grease-filled bearing according to claim 21, wherein the polytetrafluoroethylene has an average primary particle size of 0.2–15 μm.

23. An electroconductive grease-filled bearing according to claim 20, wherein the electroconductive grease comprises 50–80% by weight of the fluorocarbon oil, 15–30% by weight of the graphite and 5–25% by weight of the polytetrafluoroethylene, sum total being 100% by weight.

24. An electroconductive grease-filled bearing according to claim 23, wherein the polytetrafluoroethylene has an average primary particle size of 0.2–15 μm.

25. An electroconductive grease-filled bearing according to claim 20, wherein the polytetrafluoroethylene has an average primary particle size of 0.2–15 μm.

26. An electroconductive grease-filled bearing according to claim 1, wherein the electroconductive grease comprises 50–90% by weight of the fluorocarbon oil and 50–10% by weight of the thickening agent, sum total being 100% by weight.

27. An electroconductive grease-filled bearing according to claim 1, wherein polytetrafluoroethylene is used as a thickening agent.

28. An electroconductive grease-filled bearing according to claim 27, wherein the electroconductive grease comprises 50–80% by weight of the fluorocarbon oil, 15–30% by weight of the graphite and not more than 30% by weight of the polytetrafluoroethylene, sum being 100% by weight.

29. An electroconductive grease-filled bearing according to claim 28, wherein the polytetrafluoroethylene has an average primary particle size of 0.2–15 μm.

30. An electroconductive grease-filled bearing according to claim 27, wherein the electroconductive grease comprises 50–80% by weight of the fluorocarbon oil, 15–30% by weight of the graphite and 5–25% by weight of the polytetrafluoroethylene, sum total being 100% by weight.

31. An electroconductive grease-filled bearing according to claim 30, wherein the polytetrafluoroethylene has an average primary particle size of 0.2–15 μm.

32. An electroconductive grease-filled bearing according to claim 27, wherein the polytetrafluoroethylene has an average primary particle size of 0.2–15 μm.

33. An electroconductive grease-filled bearing according to claim 1, for use in rotatably supporting a rotating roll provided in electrophotographic process machinery.

34. An electroconductive grease-filled bearing according to claim 33, wherein the rotating roll is a photosensitive drum or a heating roll or a pressing-heating roll provided in a fixing section.

\* \* \* \* \*